United States Patent Office
3,284,650
Patented Nov. 8, 1966

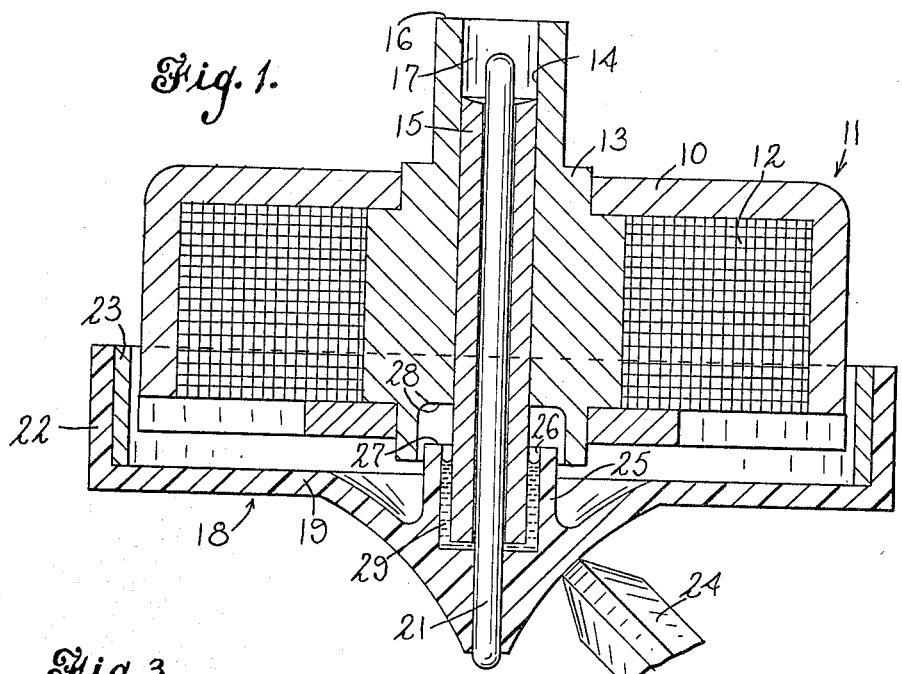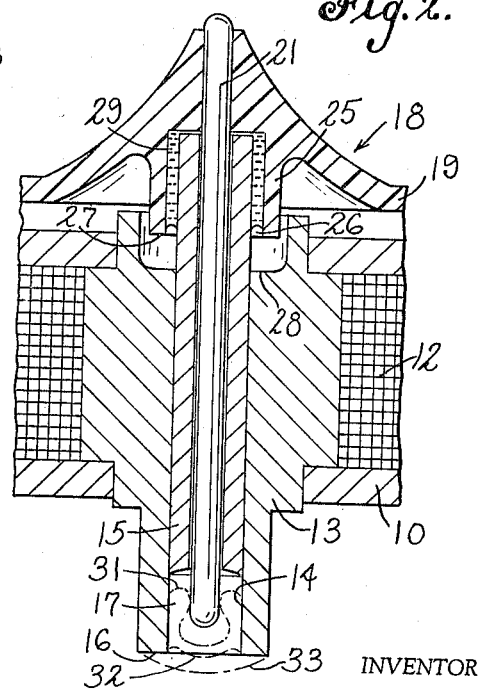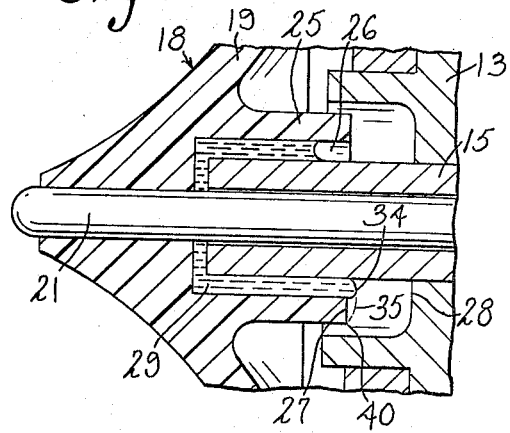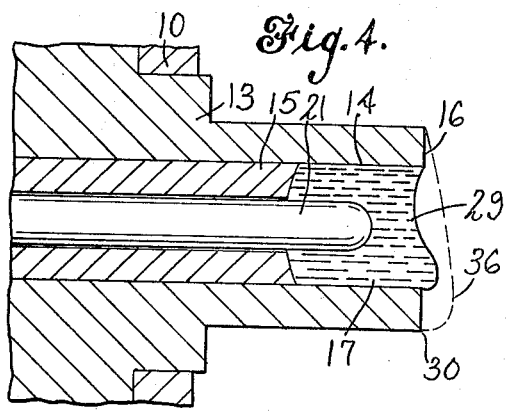

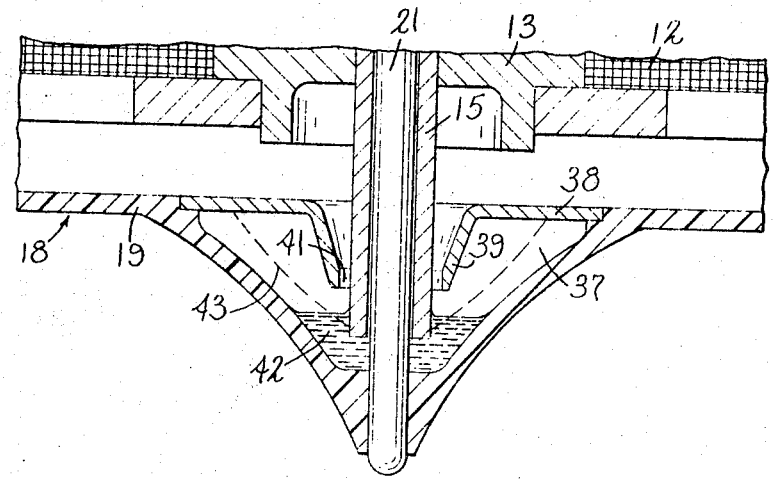
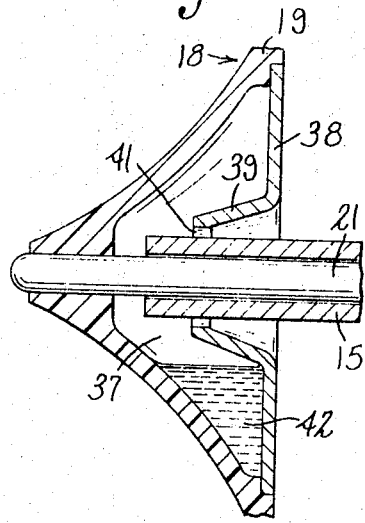
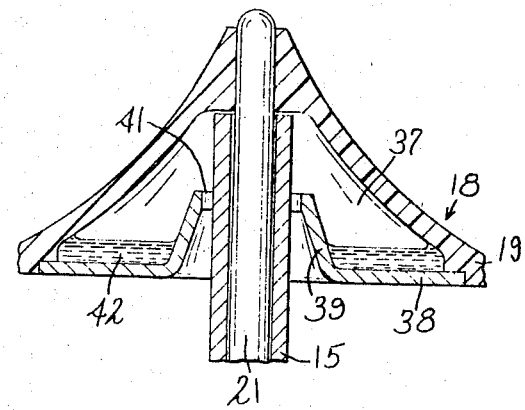

3,284,650
MOTOR HAVING BEARING CHAMBERS IN WHICH THE OIL IS RETAINED BY MENISCUS FORCES
Frederick Franz, 2 Woodruff St., West Haven, Conn.
Filed Jan. 16, 1964, Ser. No. 338,254
10 Claims. (Cl. 310—90)

This invention relates to an improved motor construction and is especially directed, but not limited, to a motor of the type used in electric metronomes.

The mechanical operation of typical electric metronomes is fully disclosed and described in United States Patents 2,150,967 and 2,817,208. Thus, the details of such metronomes need not be described herein in order to gain a full understanding of the invention as the instant invention comprises an improvement in the construction of motors of the type shown in FIG. 4 of U.S. Patent 2,150,967 and FIG. 1 of U.S. Patent 2,817,208.

Utilizing a motor constructed as shown in FIG. 4 of Patent 2,150,967, difficulty has been encountered due to leakage of the bearing lubricant. In the normal operating position of the motor, the lubricating oil escapes at the tip of the rotor cone due to gravitational forces and the centrifugal force developed during rotation of the cone causes the oil to flow outwardly and coat the outside surface of the cone. The mechanism of the metronome is driven through frictional cooperation of a wheel with the outside surface of the rotor cone and oil on the surface causes slip and erratic speed transmission, thereby hampering the proper operation of the device.

In other constructions of such motors the rotor shaft is mounted in spaced sintered bearings having an oil pocket therebetween. The sintered bearings permit the oil to leak out during an extended period of time and eventually coat the frictional driving surface of the cone. Of course, the presence of the lubricating medium is necessary to ensure smooth operation of the motor to prevent wear and noise.

Accordingly, the principal object of the invention is to provide a lubricated motor of improved construction assuring retention of the lubricant.

Another object of the invention is to provide a lubricated motor of such a construction that loss of lubricating fluid will be substantially eliminated regardless of the position in which the motor is stored.

Still another object of the invention is to provide a motor having rotor lubricating chambers so constructed and arranged that leakage of the lubricant will not occur.

A still further object of the invention is to provide a motor having rotor lubricating chambers constructed in such a manner that the surface tension of the lubricating fluid will counteract the gravitational forces on the fluid which tend to cause it to leak from the lubricating chambers.

Still other objects and advantages of the invention will in part be obvious and will in part be apparent from the specification.

In carrying forth the aforesaid objects, the invention comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which:

FIG. 1 is a sectional elevational view of a preferred embodiment of a motor constructed in accordance with the invention, the motor being depicted in its normal operating position;

FIG. 2 is a partial sectional view of the motor of FIG. 1, the motor being shown in the inverted position;

FIG. 3 is a parital sectional view, in enlarged scale, of the motor of FIG. 1, the motor having been rotated through 90° from its normal operating position;

FIG. 4 is a partial sectional view of the motor of FIG. 1, showing a portion of the motor opposite to the end shown in FIG. 3, with the motor lying in the same position as in FIG. 3;

FIG. 5 is a partial sectional view of a motor constructed in accordance with an alternate embodiment of the invention, the motor being depicted in its normal operating position;

FIG. 6 is a partial sectional view of the motor of FIG. 5 rotated 90° from the FIG. 5 position; and FIG. 7 is a view of the motor similar to FIG. 6 but showing the motor in an inverted position.

Referring now to the motor constructed in accordance with the embodiment shown in FIGS. 1 through 4, the motor stator assembly 11 including pole pieces 10 and windings 12 is of any known type. A central core or collar 13 is supported by the stator assembly within the windings, the collar being provided with a central longitudinal aperture 14 of circular cross-section. Within aperture 14 is mounted a bearing or bushing 15. The upper face 16 of collar 13 extends above an end bushing 15 thereby defining a chamber 17 whose purpose will be subsequently described. The other or lower end of bushing 15 extends substantially beyond collar 13 as clearly shown in FIG. 1.

A rotor indicated generally at 18 consists of a non-magnetic cover 19 whose central cross-section is that of a cone with an elongated shaft 21 rigidly secured in the cover and extending from the center of the cone. Shaft 21 is adapted to be received in bushing 15. Cover 19, which may be molded from a plastic material, includes a projecting skirt portion 22 which overlies a portion of stator assembly 11 in the field of the windings. To the interior surface of skirt portion 22 is secured a liner 23 which forms the magnetic armature of the motor. When an external A.C.-E.M.F. is applied to the stator windings, the rotating field generated will cause rotor 18 and its shaft to rotate within the bushing.

Shaft 21 is freely received in bushing 15 and, in the operating position as depicted in FIG. 1, the rotor is held in place by a friction wheel 24 which drives the metronome mechanism. Adjustment of the position of friction wheel 24 along the cone-shaped surface of cover 19 provides means for adjusting the speed or cycle of the metronome. This is more fully described in U.S. Patent 2,150,967.

The central interior section of cover 19 is provided with an annular collar 25 which extends toward the stator and which, in the assembled position, overlies a portion of the exterior cylindrical body of bushing 15. The inside diameter of annular collar 25 is greater than the outside diameter of bushing 15, thereby defining a chamber 26 therebetween. In the assembled position, shaft 21 extends completely through bushing 15 and into chamber 17. The outer face 27 of annular collar 25 is also spaced from the opposing surface 28 of collar 13. Surface 28 may be recessed within the collar if desired.

To lubricate shaft 21 in bushing 15, a predetermined quantity of lubricant 29 is supplied. In the normal operating position, the majority of lubricant will be retained in chamber 26 and, if care is taken not to overfill the chamber, oil will not be flung out of the chamber onto the rotor, as has been previously experienced with known constructions, because the centrifugal forces developed during rotation have no vertical components. Naturally, shaft 21 is secured in the rotor so that no lubricant can leak out along the shaft.

While a device utilizing a motor constructed as described will operate in the position shown in FIG. 1, it is quite conceivable that the motor will lie in other positions for extended periods, such as during storage and shipping. If the motor is inverted as shown in FIG. 2, the lubricant 29 in chamber 26 will tend to flow toward face 27. By providing a small radial clearance between the inner wall of collar 25 and the outer wall of bushing 15, the surface tension of the oil will support a reasonably long column of oil without leakage. As an example, tests have shown that a radial clearance of .020″, will retain a .260″ column of lubricant in chamber 26 when the lubricating oil has a kinematic viscosity of 500 centistokes.

If the motor is stored in the inverted (FIG. 2) position, a phenomonon analogous to syphoning occurs. Even though the shaft-bearing clearance is quite small, the layer of oil along the shaft extending from chamber 26 develops a head of oil which is opposed by the head of oil within chamber 26. Since the bearing is quite long, the head of oil in the bearing tends to overcome the head in chamber 26 and, as the oil in the bearing descends under the force of gravity, the surface tension of the oil causes the oil in chamber 26 to be drawn into the bearing and thereafter flow downwardly. By way of example, in motors having shaft diameters in the range of .060″ to .070″, it has taken between two and five days for the oil to flow into chamber 17 from chamber 26. Variation in the time required will, of course, be a function of shaft-bearing clearance, the ambient temperature, etc. Except for a thin film coating the surface of chamber 26 and a film within the bearing, all lubricant will eventually be transferred into chamber 17. As chamber 17 starts to fill, the oil will initially build up at the end of shaft 21 and will initially form into a shape roughly indicated by broken line 31. As the volume of lubricant in chamber 17 increases, the surface of the lubricant will roughly follow broken line 32. When all the lubricant has drained from chamber 26, a meniscus will be formed at the lower end of collar 13 clinging to face 16. The surface of the meniscus will roughly follow broken line 33. The surface tension of the lubricating fluid causes it to hold the position indicated by broken line 33 so that the motor may rest indefinitely in the inverted (FIG. 2) position without loss of oil. As long as surface 16 is out of contact with any other object and as long as shaft 21 is wholly within chamber 17, no loss of oil will occur.

In constructing the motor, it is necessary that the volume of chamber 17 be at least as great as the volume of chamber 26 so that chamber 17 will be able to accommodate all the oil drained from chamber 26. If the chamber volumes are equal, the proper amount of lubricating fluid may be easily supplied by merely filling chamber 17 in the upright (FIG. 1) position. In this manner, overfilling is prevented. Of course, it will be understood that, when the inverted motor is returned to its normal position, the lubricant will flow back into chamber 26.

If the motor is rotated from the normal (FIG. 1) position to a position wherein shaft 21 is horizontal, the oil will tend to flow out of the bottom of annular chamber 26 as shown in FIG. 3. Face 27 of collar 25 is squared off or perpendicular to bearing 15, thereby causing a meniscus to be formed as indicated at 34. If the motor remains in the FIG. 3 position over an extended period, the lubricant may flow into the position indicated by the broken line 35. However, due to the surface tension of the lubricant, the lubricant will not flow beyond the sharp corner 40 if, as previously explained, chamber 17 is not overfilled.

If, however, the motor is turned on its side after all the oil has flowed into chamber 17 (FIG. 2), a situation such as depicted in FIG. 4 will occur. In such a case, the oil will eventually flow into a position indicated by broken line 36 but will not flow past the sharp edge 30 of face 16. In any event, when the motor is finally returned to its normal operating position, the lubricant will flow back into chamber 26.

An alternate embodiment is shown in FIGS. 5 through 7 where in the chamber within rotor 18 is of greater capacity and constructed to retain the major portion of the lubricating fluid regardless of the position of the motor. In most respects, the motor is constructed similar to the motor shown in FIG. 1 and thus it will not be necessary to describe the details at length. On the inner side of the cone portion 19, the cover is cut away to define a large chamber 37 having the general configuration of an inverted truncated cone. A cap 38 having an annular depending lip 39 seals over the base of cone-shaped chamber 37. Annular lip 39 terminates in a circular aperture 41 adapted to receive bushing 15. Clearance is provided between aperture 41 and bushing 15 to prevent binding of the cap on the bushing. As before, the cover carries a shaft 21 which rides in the bushing. In the alternate embodiment, the upper end, including chamber 17, will be of the construction shown in FIG. 1.

In the normal operating position lubricant 42 will lie in chamber 37 in the position shown in FIG. 5. During operation of the motor, the centrifugal force caused by the spinning of cover 19 will cause the lubricating fluid to be thrown out from the center. A cross-section of the surface of the fluid will approximate that of a parabola as indicated by broken line 43. Escape of the lubricant is prevented by cap 38. When the motor lies on its side with shaft 21 in a horizontal position as shown in FIG. 6, the lubricant will flow downwardly to fill the lower part of the chamber as shown in FIG. 6. If the motor is inverted, as shown in FIG. 7, the fluid will collect along the inner side of cap 38. Because of this construction, wherein the level of oil is always below aperture 41 regardless of the position of the motor, leakage of oil will not occur. Also, the syphoning action described in connection with FIG. 2 will be quite minimal as the majority of the lubricant will stay within chamber 37 as shown in FIG. 7 when the motor is inverted. However, any lubricant which does collect in chamber 17 during inversion of the motor, will be retained in the chamber due to the surface tension of the oil as previously described.

It will thus bee seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:
1. A lubricated motor including, in combination:
 (A) a collar having a first end and a second end,
  (i) said collar having a central bearing portion with a longitudinal aperture therethrough,
  (ii) said central bearing portion having a first end approaching the first end of said collar within said collar to define a first lubricant-receiving chamber between the first end of said collar and the first end of the bearing portion thereof,
  (iii) said central bearing portion having a second end projecting beyond the second end of said collar,
 (B) a shaft rotatably mounted in the longitudinal aperture in said bearing portion,
  (i) one end of said shaft extending through the first end of said bearing portion into said first chamber, and

(C) a rotor element secured to the other end of said shaft,
   (i) said rotor element being secured to said shaft beyond the second end of said bearing portion,
   (ii) said rotor element including a central annular projection extending along a part of the projecting bearing portion in parallelism thereto and being spaced therefrom to define a second lubricant-receiving chamber.

2. The structure defined in claim 1 wherein the volume of said first chamber is approximately equal to the volume of said second chamber.

3. The structure defined in claim 1 wherein the volume of said first chamber is equal to or greater than the volume of said second chamber.

4. The structure defined in claim 1 wherein the outside peripheral edge of the terminal surface of said central annular projection defines a sharp corner.

5. The structure defined in claim 1 wherein the outside peripheral edge of the first end of said collar defining a limit of said first chamber defines a sharp corner.

6. A lubricating-oil-receiving chamber for a motor comprising a collar having a first end and a second end, the former of which may be oriented as in storage of the motor with the first end lowermost but being uppermost in the normal operative position of the motor, the first end of the collar being open at its distal extremity and the collar being adapted for support so that the last-mentioned extremity is free of any contact with a solid, the collar having a central bearing portion with a longitudinal aperture therethrough, the bearing portion having a first end approaching the first end of the collar within the latter to define an oil-receiving chamber between the first end of the collar and the first end of the bearing portion thereof, and a motor shaft rotatably mounted in said bearing portion and having an end extending into but not through said chamber, the peripheral surface of the first end of the collar, forming with the side wall structure of the chamber the outer extremity of the oil chamber, being planar and sharp cornered to facilitate the formation of an oil-retaining meniscus over the chamber when gravity tends to force oil out of the chamber.

7. In combination, a rotor element for rotation in a horizontal plane, a shaft secured in and extending upwardly from said rotor element, a central annular projection integral with said rotor element and extending upwardly, said projection extending parallel to and encircling said shaft, and a bearing portion for rotatably receiving said shaft and provided with a support, said bearing portion extending into said annular projection and being spaced from the rotor to define with the latter and the shaft an annular oil-lubricant-receiving chamber closed at the bottom by the rotor element and the shaft, said annular projection terminating at its distal end in a planar sharp-edged peripheral surface forming with the side wall structure of the chamber the outer extremity of the oil chamber and being free of contact with any solid to facilitate the formation of an oil-retaining meniscus over the chamber when gravity tends to force oil out of the chamber.

8. In combination, a rotor element for rotation in a horizontal plane, generally of cup shape having a relatively small interior cross section at its base and a relatively large interior cross section at its mouth, the side wall structure of the cup providing an interior surface sloping from the mouth toward the base, a shaft secured in and extending upwardly from the base of the rotor element, a cap fixed to the cup through which the shaft extends, the cap having a central open downward projection tapering toward the axis of the shaft, and a bearing receiving the revoluble shaft and having a stationary support, the bearing terminating short of the base of the rotor element and forming with the latter and the cap a chamber for lubricating oil, and the bearing extending with clearance through the cap projection, oil thrown outwardly from the cup base on rotation of the rotor shaft tending to return by gravity on said sloping surface to the base of the cup, and said tapered projection of the cap, serving to return oil to said base by gravity and also tending to prevent leakage of oil from the cup.

9. In combination, a rotor element for rotation in a horizontal plane, generally of cup shape, having a base portion and a mouth portion, a shaft secured in and extending upwardly from the base of the rotor element, a cap fixed to the cup through which the shaft extends, the cap having a central open downward projection, and a bearing receiving the revoluble shaft and having a stationary support, the bearing terminating short of the base of the rotor element and forming with the latter and the cap a chamber for lubricating oil, and the bearing extending with clearance through the cap projection, the cup and the cap tending to prevent leakage of oil from said chamber when the assembly is inverted as in storage.

10. A lubricated motor comprising a collar having a first end and a second end, the former of which may be oriented as in storage of the motor with the first end lowermost but being uppermost in the normal operative position of the motor, the first end of the collar being open at its distal extremity and the collar being adapted for support so that the last-mentioned extremity is free of any contact with a solid, the collar having a central bearing portion with a longitudinal aperture therethrough, the bearing portion having a first end approaching the first end of the collar within the latter to define an oil-receiving chamber between the first end of the collar and the first end of the bearing portion thereof, a motor shaft rotatably mounted in said bearing portion and having an end extending into but not through said chamber, the peripheral surface of the first end of the collar, forming with the side wall structure of the chamber the outer extremity of the oil chamber, being planar and sharp cornered to facilitate the formation of an oil-retaining meniscus over the chamber when gravity tends to force oil out of the chamber, and a rotor element secured to said shaft beyond the second end of said bearing portion and including a central annular upward projection extending along a part of the projecting bearing portion and being spaced therefrom to define with the latter and the shaft a second lubricating oil-receiving chamber, which is of annular form encircling the lower extremity of the bearing portion and encircling a portion of the shaft between the rotor and the bearing portion, the distal extremity of said rotor projection being free from contact from any solid and being sharp cornered to facilitate the formation of an oil-retaining meniscus over the second lubricating oil-receiving chamber when gravity tends to force oil out of the last-mentioned chamber.

References Cited by the Examiner

UNITED STATES PATENTS

| | | | |
|---|---|---|---|
| 704,327 | 7/1902 | Heck | 308—96 |
| 2,053,425 | 9/1936 | Else | 310—90 |
| 2,055,480 | 9/1936 | Coberly | 310—87 |
| 2,517,233 | 8/1950 | Peters | 310—90 |
| 2,524,555 | 10/1950 | Willits | 310—90 |
| 2,904,709 | 9/1959 | Lautner | 310—90 |
| 2,947,893 | 8/1960 | Bussone | 310—90 |
| 3,103,393 | 9/1963 | Kohlhagen | 310—90 |
| 3,196,297 | 7/1965 | Kaeding | 310—259 |

FOREIGN PATENTS 438,980   12/1926   Germany.

MILTON O. HIRSHFIELD, *Primary Examiner.*

J. W. GIBBS, *Assistant Examiner.*